Figure 1:
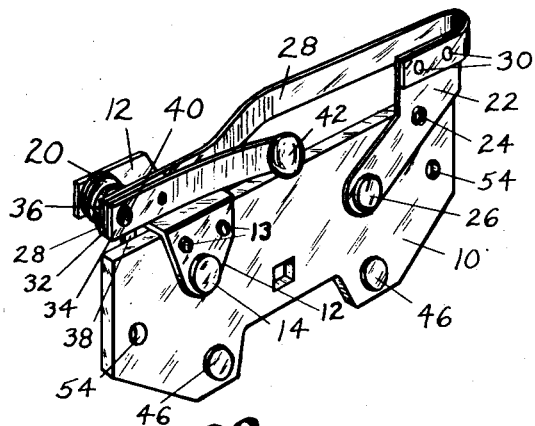

Oct. 9, 1951 S. S. WOLFF 2,570,998
SWITCH FOR DYNAMOELECTRIC MACHINES
Filed Oct. 22, 1948

INVENTOR
Samuel S. Wolff
BY
Rey Eilers
ATTORNEY

Patented Oct. 9, 1951

2,570,998

UNITED STATES PATENT OFFICE 2,570,998

SWITCH FOR DYNAMOELECTRIC MACHINES

Samuel S. Wolff, Clayton, Mo., assignor to Century Electric Company, St. Louis, Mo., a corporation of Missouri Application October 22, 1948, Serial No. 55,865

3 Claims. (Cl. 200—153)

This invention relates to improvements in dynamoelectric machines. More particularly, this invention relates to an improved switch for dynamoelectric machines.

It is therefore an object of the present invention to provide an improved switch for dynamoelectric machines.

In the operation of certain dynamoelectric machines it is customary to employ switches that open and close circuits in those machines as the speeds of the rotors of the machines vary. For example, in the operation of dynamoelectric machines which have starting and running windings, it is customary to employ switches that open the circuits of the starting windings when the rotors of those machines attain a certain speed and close those circuits when the rotors of those machines slow down. The use of such switches makes it possible to obtain a strong starting torque for the machines while keeping the normal operating resistance of the machines at a low value. The opening and closing of the switches is customarily effected by providing centrifugally-operated governors adjacent the switches, and setting those governors so they open the switches at predetermined rotor speeds and so they permit the switches to close whenever the rotor speed is below the predetermined value.

Such arrangements of switch and governor work effectively when the governors are set in just the right position relative to the switches; assuming absence of "play" in the moving parts of the governors or in the bearings of the dynamoelectric machines. However, it is often difficult to fix the governors in just the precise position on the shafts of the rotors; and a lack of precise positioning of the governors relative to the switches can cause imperfect actuation of the switches. In some instances unsteady and insufficient contact may be provided by the starting switches; and in other instances, serious arcing can occur. The results in both instances are objectionable. The present invention obviates these objections by providing a switch wherein the contacts are promptly closed when the switch arm moves and remain closed although the switch arm continues to move. With such a switch, it is possible to obtain certain and sure actuation of the switch even though the governor is not positioned precisely on the shaft of the dynamoelectric machine. It is therefore an object of the present invention to provide a switch, for dynamoelectric machines, wherein the contacts are promptly closed when the switch arm moves and wherein the contacts remain closed although the switch arm continues to move.

Several different types of switches have been proposed for use with the centrifugally operated governors of dynamoelectric machines; and several of those switches were intended to assure certain and sure operation even though the governors were not precisely positioned on the shafts of those machines. Those switches, however, either could not compensate sufficiently for improper positioning of the governors or they were unduly complicated and expensive. It is therefore an object of the present invention to provide a simple, inexpensive switch that is certain and sure in operation.

The switch provided by the present invention has a bendable switch arm and a bendable cantilever spring that supports said arm and the movable contact of the switch. Both the switch arm and the cantilever spring bend during the operation of the switch; and the conjoint bending of the two elements minimizes the distortion of each. This reduces the fatigue of both of said members; and it also makes it possible for the movable contact to remain firmly pressed against the fixed contact while said members bend. It is therefore an object of the present invention to provide a switch which has a bendable switch arm, and a bendable cantilever spring that supports said switch arm and the movable contact of said switch.

The cantilever spring of the switch provided by the present invention is many times longer than the distance which its free end must move during opening or closing of the switch. As a result a long radius of movement is provided for the movable contact, and the movable and stationary contacts experience only slightly relative movement as the switch continues to move after the contacts engage each other. It is therefore an object of the present invention to provide a switch, for dynamoelectric machines, wherein the cantilever spring is many times longer than the distance its free end moves.

Force, sufficient to actuate the switch, is applied to the movable contact of the switch by mounting that contact on a cantilever spring, by mounting a switch arm on the free end of the cantilever spring, and by positioning the switch arm adjacent the centrifugally-operated governor of the dynamoelectric machine. The switch arm is secured to the free end of the cantilever spring; and thus it can apply force at the point where that force can cause prompt and full movement of the movable contact. Moreover, by avoiding the application of force to the spring at a point intermediate its ends, the present invention permits the bending of the cantilever spring to be distributed throughout its entire length; thus avoiding undue fataigue for that spring. It is therefore an object of the present invention to mount the movable contact of the switch on the free end of a cantilever spring and to secure a switch arm to the free end of the cantilever spring.

The switch arm and the free end of the cantilever spring have an intermediate stiffening plate positioned between them. This stiffening plate acts upon the free end of the cantilever spring and upon the switch arm to limit bending of the free end of the cantilever spring until after the movable contact mounted on the free end of the cantilever spring is in engagement with the fixed contact of the switch; and thereafter that stiffening plate acts upon the switch arm and the free end of the cantilever spring to bend the free end of the cantilever spring and thereby permit overtravel of the switch. In addition, the stiffening plate quickly restores the switch arm to its position adjacent the centrifugal governor when the rotor of the dynamoelectric machine slows down. It is therefore an object of the present invention to position a stiffening plate between the switch arm and the free end of the cantilever spring of a dynamoelectric machine.

It is desirable to use a long cantilever spring for the switch, and yet it is desirable to avoid "whipping" or rebounding of that spring. The present invention satisfies both of these requirements by providing a detent on the free end of the cantilever spring which limits movement of the free end of the cantilever spring relative to the fixed contact of the switch; and in addition that detent abuts against a plate of insulation and causes the free end of the cantilever spring to start from the same position each time. It is therefore an object of the present invention to provide a detent that limits movement of the cantilever spring which carries the movable contact of the switch.

Other and further objects and advantages of the present invention should become apparent from an examination of the drawing and accompanying description.

In the drawing and accompanying description a preferred embodiment of the present invention is shown and described but it should be understood that the drawing and accompanying description are for the purposes of illustration only and do not limit the invention and that the invention will be defined by the appended claims.

In the drawing

Figure 2:
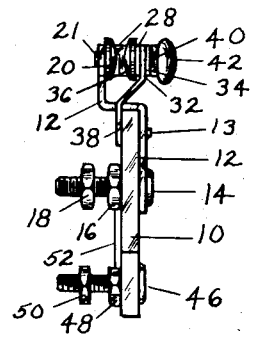
Figure 3:
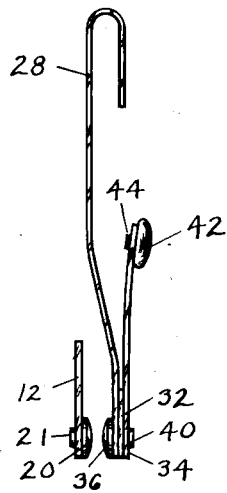
Figure 4:
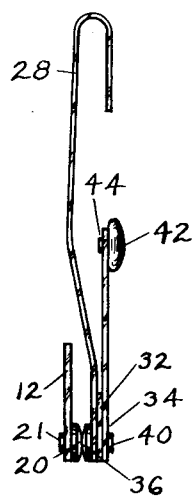
Figure 5:
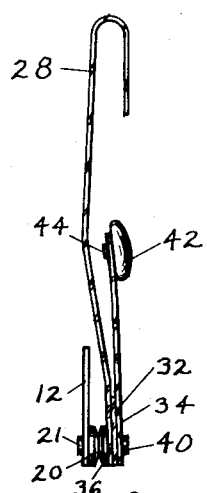

Fig. 1 is a perspective view of a starting-winding switch that is made in accordance with the principles and teachings of the present invention, Fig. 2 is an end elevational view of the starting-winding switch shown in Fig. 1, Fig. 3 is a plan view of the contacts of the switch shown in Fig. 1, and it shows those contacts in open position, Fig. 4 is a plan view of the contacts shown in Fig. 3, and it shows those contacts in closed position, and Fig. 5 is a plan view of the contacts shown in Figs. 3 and 4, and it shows those contacts in the overtravel position.

In the drawing, the numeral 10 denotes a flat plate of insulating material. This plate has a generally rectangular form; but the lower ends thereof are cut away at an angle, and the center portion of the bottom of the plate is recessed. Such a configuration of the plate 10 facilitates positioning of the starting-winding switch in the limited space within the terminal box of a dynamoelectric machine. The numeral 12 denotes a support, of electrically conducting material such as copper, which is fixedly secured adjacent one end of the plate 10 by rivets 13 and by a bolt 14 which extend through the support and the plate 10. The support 12 has an offset portion intermediate the top and bottom thereof; and this offset portion is disposed at ninety (90) degrees to the rest of the support 12, and it rests upon the top edge of the plate 10. As a result, the offset portion facilitates the exact positioning of the support 12 relative to the plate 10. A nut 16 is threaded tightly onto the projecting end of the bolt 14, and it assists in maintaining the support 12 in intimate engagement with the plate 10 while holding bolt 14 in assembled relation with plate 10 and support 12. The conjoint effect of rivets 13 and bolt 14 and nut 16 is to fixedly secure the support 12 to the plate 10 irrespective of the vibration experienced in dynamoelectric machines, and irrespective of the forces which the centrifugally operated governor of the dynamoelectric machine will apply to the starting-winding switch. A nut 18 is threadable onto the projecting end of the bolt 14, and that nut will cooperate with the nut 16 to confine and hold any wire or lead in position relative to the bolt 14.

The support 12, being of electrically conducting material, will readily conduct current from a lead or wire held between the nuts 16 and 18 to the upper end of that support. A fixed contact 20 is secured to the upper end of support 12, as by a rivet 21 which passes through the upper end of support 12 and permanently secures the contact 20 to that support. The junction between the support 12 and the fixed contact 20 is so intimate, by reason of rivet 21, that current flows with but little resistance from the support 12 into the fixed contact 20.

A support 22, of electrically conducting material as for example copper, is fixedly secured adjacent the other end of the plate 10. This support is secured to the plate 10 as by a rivet 24 and a bolt 26, both of which extend through the support 22 and the plate 10. A nut, not shown, is threaded onto the projecting end of the bolt 26 and it serves to hold that bolt in assembled relation with the support 22 and plate 10. A second nut, similar to the nut 18, is threadable onto the projecting end of the bolt 26; and it cooperates with the first nut, to secure a wire or lead to the bolt 26.

The support 22, being of electrically conducting material, will readily conduct current from the bolt 26 to the upper end of that support. An elongated spring 28 has a straight portion at one end thereof, and that portion is secured to the upper end of the support 22, as by two rivets 30 which extend through the support 22 and the end of spring 28. The securement of the spring 28 to the upper end of the support 22 is so tight, by reason of the rivets 30, that no appreciable contact resistance exists between the support 22 and the spring 28.

The spring 28 has an arcuate portion adjacent the portion of the spring which is attached to the support 22, it has a straight portion extending from the arcuate portion in a direction approximately parallel to the portion which is secured to support 22, it has another straight portion that is angularly disposed relative to the first two straight portions; and it has still another straight portion which is approximately parallel to the first two straight portions. This latter portion constitutes the free end of the spring 28, which spring is a cantilever spring; and this latter portion is displaced from the plane of the second straight portion by the angularly disposed portion of the spring.

The spring 28 is preferably made of a resilient conductor of electricity, as for example Phosphor bronze, and it carries on its free end the movable contact 36. This movable contact 36 is supported on one face of the free end of cantilever spring 28, and a stiffening plate 32 is mounted on the other face of that free end of the cantilever spring 28. A switch arm 34 is mounted on the other face of the stiffening plate 32; and thus the stiffening plate is disposed between the free end of the spring 28 and the switch arm 34. The movable contact 36, the free end of cantilever spring 28, the stiffening plate 32, and the switch arm 34 are all held in assembled relation by a rivet 40 which is formed integrally with the movable contact 36 and extends through the cantilever spring 28, the stiffening plate 32, and the switch arm 34.

The cantilever spring 28 is considerably longer than the distance which its free end must move in carrying the movable contact 36 toward and away from the fixed contact 20. This enables the spring 28 to be made of metals other than high resistance spring steels, and yet it enables that spring to have the long life obtainable with such spring metals. The spring 28 is dimensioned so the movable contact 36, supported on the free end thereof, is held in register with the fixed contact 20 mounted on the support 12.

The switch arm 34 is held close to and approximately parallel with that straight portion of the cantilever spring 28 which constitutes the free end of spring 28; but the switch arm 34 is displaced an appreciable distance from the rest of the spring 28. This result is attained by having the angularly disposed portion of the cantilever spring 28 directed away from the switch arm 34. This arrangement facilitates bending of the free end of the cantilever spring 28 during overtravel of the switch arm 34 without causing the free end of the switch arm 34 to contact the cantilever spring 28. This not only assures minimum resistance to overtravel but it avoids cramping of the spring 28, and thereby permits the bending of that spring to be distributed over its length.

A button 42 is mounted on the free end of the switch arm 34, and that button is held in permanent engagement with the switch arm 34 by means of a rivet 44 that passes through the free end of the switch arm 34. The button 42 has a face which is wear-resistant and yet has a low frictional component so that it can bear against a collar on the centrifugal governor of a dynamoelectric machine without materially increasing the friction in that machine. The collar of the centrifugal governor will move as the speed of the dynamoelectric machine varies, and it will cause switch arm 34 to move in response to changes in that speed.

The bolts 46 carried by the plate 10 of insulating material are provided with nuts 48 and 50; the nuts 48 maintaining the bolts 46 in assembled relation with the plate 10, and the nuts 50 cooperating with the nuts 48 to confine wires or leads in assembled relation with the bolts 46. A plate 52 of electrical conducting material, as for example copper, extends in a generally vertical direction between the bolt 26 and that bolt 46 which is disposed almost directly below the bolt 26. This plate electrically connects the two bolts 26 and 46, and thus it provides a connection through which current introduced into the rearmost bolt 46 can pass directly upward to the support 22. That current will then flow through the elongated spring 28 to the movable contact 36. Some heat will be generated in the spring 28 when the contacts 20 and 36 are in engagement, but that current will be of short duration and thus the heat will be small. Moreover, that heat will quickly radiate from the large surface area of spring 28; and consequently the spring 28 will operate with little or no diminution of its resilience. The plate 52 may be removed, and its removal makes possible the attainment of other electrical connections for the dynamoelectric machine. The numeral 54 denotes mounting openings in the plate 10, which openings receive bolts, screws or other fasteners that support the plate 10 in position in the terminal box of the dynamoelectric machine.

It is important to avoid "whipping" or rebounding of the cantilever spring 28, and yet it is important to have the cantilever spring 28 long relative to the movement of the movable contact 36. The present invention satisfies both of these requirements by providing a detent 38 on the bottom of the stiffening element 32; and this detent extends downwardly and rearwardly of the plate 10. The free end of the cantilever spring 28 overlies the top of the plate 10 while the detent 38 extends behind that plate. The detent 38, by pressing against the back of the plate 10 limits the distance which the free end of the spring 28 can move away from the fixed contact 20 on the support 12. Thus there is no tendency or possibility for the spring 28 to have such a long movement that it tends to "whip" or rebound.

The button 42, which receives the force applied by the centrifugal governor, is displaced from the spring 28; and yet it can cause bending of that spring. By having the button 42 supported primarily by the switch arm 34 and secondarily by the cantilever spring 28, it is possible to have force applied to the free end of the spring although the force is directed to a point intermediate the ends of the cantilever spring 28. This is desirable for several reasons; one of which is that it reduces the overall space required in the terminal box of the dynamoelectric machine since the cantilever spring 28 can then extend on opposite sides of the shaft. It is also desirable because it facilitates the application of force to the free end of the cantilever spring while still permitting the entire length of the cantilever spring 28 to bend.

In operation, the component parts of the starting winding switch are normally in the position shown in Fig. 5. In that position, the button 42 on switch arm 34 is horizontally displaced by the collar of the centrifugal governor; such displacement causing switch arm 34 to be inclined toward the cantilever spring 28. This inclination of switch arm 34 is attained by bending of that arm and bending of the cantilever spring 28. Both the bending of the switch arm 34 and of the spring 28 is resisted by the action of stiffening plate 32; and the resultant action is to hold the movable contact 36 tightly against the fixed contact 20, thus insuring a good electrical connection between those contacts. As the rotor of the dynamoelectric machine gets up to speed, the collar of the centrifugal governor will move away from the button 42, permitting the cantilever spring 28 and the switch arm 34 to begin to resume their unstressed form. As the button 42 begins to move with the receding collar of the centrifugal governor, the switch arm 34, stiffening plate 32 and cantilever spring 28 will assume the positions shown in Fig. 4. When the collar of the centrifugal governor has moved out of contact with button 42, as it will do when the rotor of the dynamoelectric machine reaches a predetermined speed, the switch arm 34, stiffening plate 32 and cantilever spring 28 will assume the position shown in Figs. 2 and 3. In the positions shown in Figs. 4 and 5, the contacts 20 and 36 are closed; but in the position shown in Figs. 2 and 3 the contacts are open. While the shift from the closed position of Fig. 5 to the open position of Figs. 2 and 3 requires considerable movement of button 42, that movement will usually occur quite rapidly since the centrifugal governors usually are quick-acting.

The movement of the cantilever spring 28 away from fixed contact 22 is limited by the detent 38 on the stiffening plate 32, and thus the gap between the fixed contact 20 and the movable contact 36 will not be excessive. This gap will be sufficient to avoid any arcing, and it will continue to exist until such time as the rotor speed falls below a predetermined value; and thereafter the collar of the centrifugal governor will again contact the button 42 and move that button toward the cantilever spring 28. As it does so, the button 42 and the switch arm 34 will pass through the position of Fig. 4 into the position of Fig. 5. It will be noted that the switch arm 34 tends to remain relatively unbent during the initial movement of button 42 and that the stiffening plate also tends to remain unbent. As a result, the principal bending during the initial movement of button 42, occurs in the length of the cantilever spring 28. Only after the movable contact 36 has engaged the fixed contact 20 does any appreciable bending of the switch arm 34 and the free end of the cantilever spring 28 occur. At such time, the obtuse angle between the angularly disposed portion of the spring 28 and the free end of the spring 28 tends to increase; and then the switch arm 34 itself finally begins to bend. This bending is possible because of the horizontal displacement of the free end of the spring 28 from the second straight portion of that spring.

The stiffening member 32 cooperates with switch arm 34 and the free end of cantilever spring 28 to provide a virtually linear movement of movable contact 36 in the initial stages of the switch closing operation. Thus, when the collar of the centrifugal governor moves a certain distance the movable contact moves almost exactly the same distance. When, however, that collar has moved a distance greater than the gap between the fixed contact 20 and the movable contact 36, the collar will continue to move without interrupting the engagement between the fixed contact 20 and the movable contact 36. This is made possible by the conjoint bending of switch arm 34 and cantilever spring 28; neither of the bends being severe enough to cause separation of the contacts 20 and 36. Consequently, once the contacts 20 and 36 have been moved into engagement, they will remain in engagement until the direction of movement of the button 42 is reversed.

The starting-winding switch provided by the present invention can compensate for practically all misalignment and malpositioning of the centrifugal governor of dynamoelectric machines which is likely to be met in practice. It does so, by providing the sizeable overtravel shown; and thus it can be set closely adjacent the centrifugal governor when the switch is in the position shown in Fig. 3. Any normal excess travel of the collar of the centrifugal governor will be unable to separate the contacts 20 and 36 after they have been moved into engagement with each other.

Whereas a preferred embodiment of the present invention has been shown and described in the drawing and accompanying description it should be obvious to those skilled in the art that various changes may be made in the form of the invention without affecting the scope thereof.

What I claim is:

1. A switch for use in dynamoelectric machines that comprises a support of insulating material, a fixed contact mounted on said support of insulating material, an elongated spring that has a reentrant end, said reentrant end being fixed relative to said support of insulating material and the other end of said spring being free, a movable contact secured to said other end of said spring, a stiffening plate carried by said other end of said spring, a switch arm secured to said other end of said spring so said other end of said spring and said switch arm are oppositely disposed of said stiffening plate, a stop movable with said spring and being engageable with said support of insulating material to limit movement of said spring, and a button carried by said switch arm, said switch arm being close to and approximately parallel to the said other end of said spring but being displaced from the rest of said spring and extending toward said reentrant end of said spring, said button being positioned intermediate the ends of said spring, said stiffening plate coacting with said switch arm and said other end of said spring to prevent appreciable bending of said switch arm or said other end of said spring until said movable contact engages said fixed contact but permitting bending of said switch arm and said other end of said spring after said movable contact engages said fixed contact, whereby said movable contact moves substantially linearly in moving toward said fixed contact.

2. A switch that comprises a fixed contact, an elongated spring that has one end fixed and the other end free, a stiffening plate carried by said other end of said spring, a movable contact secured to said other end of said spring, a switch arm secured to said other end of said spring, and a button carried by said switch arm, said switch arm being close to and approximately parallel to said other end of said spring but being displaced from the rest of said spring and extending toward said fixed end of said spring, said button being positioned intermediate the ends of said spring, said stiffening plate coacting with said switch arm and said other end of said spring to prevent appreciable bending of said switch arm or said other end of said spring until said movable contact engages said fixed contact but permitting bending of said switch arm and said other end of said spring after said movable contact engages said fixed contact, whereby said movable contact moves substantially linearly in moving toward said fixed contact.

3. A switch that comprises a fixed contact, an elongated spring that has a reentrant end, said reentrant end of said spring having one side thereof fixed, the other end of said spring being free, said other end of said spring having a portion which is substantially parallel to the said one side of said reentrant end of said spring and having an angularly extending portion between said parallel portion and the other said of said reentrant end, said reentrant end and said parallel portion and said angularly disposed portion defining a recess, a movable contact secured to said other end of said spring, a switch arm secured to said other end of said spring and extending toward said one side said reentrant end and overlying part of said recess, and an actuating button carried by said switch arm, said switch arm and said other end of said spring being bendable to permit said switch to move into said recess and thereby provide overtravel for said button.

SAMUEL S. WOLFF.

REFERENCES CITED

The following references are of record in the file of this patent:

UNITED STATES PATENTS

| Number | Name | Date |
| --- | --- | --- |
| 281,363 | Heap | July 17, 1883 |
| 2,061,391 | Tamsitt | Nov. 17, 1936 |
| 2,305,441 | Pepper | Dec. 15, 1942 |
| 2,341,931 | Lloyd | Feb. 15, 1944 |
| 2,458,518 | Kohl | Jan. 11, 1949 |
| 2,476,045 | Kaminky | July 12, 1949 |

FOREIGN PATENTS

| Number | Country | Date |
| --- | --- | --- |
| 540,529 | Great Britain | Oct. 21, 1941 |